United States Patent
Ilic et al.

(10) Patent No.: US 9,263,971 B2
(45) Date of Patent: *Feb. 16, 2016

(54) DISTRIBUTED VOLTAGE SOURCE INVERTERS

(71) Applicants: Milan Ilic, San Jose, CA (US); Mika Nuotio, San Jose, CA (US)

(72) Inventors: Milan Ilic, San Jose, CA (US); Mika Nuotio, San Jose, CA (US)

(73) Assignee: EMPOWER MICRO SYSTEMS INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/715,655

(22) Filed: Dec. 14, 2012

(65) Prior Publication Data

US 2014/0169053 A1     Jun. 19, 2014

Related U.S. Application Data

(60) Provisional application No. 61/576,363, filed on Dec. 16, 2011.

(51) Int. Cl.
*H02M 7/5387* (2007.01)
*H02J 3/38* (2006.01)
(Continued)

(52) U.S. Cl.
CPC .......... *H02M 7/53873* (2013.01); *H02J 3/383* (2013.01); *H02M 7/48* (2013.01); *H02M 2001/007* (2013.01); *H02M 2001/0077* (2013.01); *Y02E 60/60* (2013.01)

(58) Field of Classification Search
CPC ............ G05F 1/67; H02M 2001/0077; H02M 7/5387; H02J 3/383; Y02B 10/10
USPC ............................ 363/71; 323/906; 307/77, 82
See application file for complete search history.

(56) References Cited

U.S. PATENT DOCUMENTS 5,642,275 A    6/1997 Peng et al.
6,542,344 B1 *  4/2003 Mashiko ...................... 361/93.9
(Continued)

FOREIGN PATENT DOCUMENTS

CN    100461607 C    2/2009
CN    100559691 C    11/2009
(Continued)

OTHER PUBLICATIONS

Author: Chapman et. al, Title: "Photovoltaic AC Module Composed of a Very Large Number of Interleaved Inverters", Symposium: "Applied Power Electronics Conference and Exposition (APEC), 2011 Twenty-Sixth Annual IEEE", Date: Mar. 6-11, 2011, pp. 976-981, Print ISBN: 978-1-4244-8084-5, Publisher: IEEE, Location: Forth Worth, TX.

(Continued)

*Primary Examiner* — Harry Behm
(74) *Attorney, Agent, or Firm* — Tran & Associates

(57) ABSTRACT

Systems and methods are disclosed with multiple direct current (DC) voltage source inverters to supply power to an alternating current (AC) power system. The system includes a plurality of full bridge inverter stages, each having a primary node and a secondary node, each of said full bridge inverter stages having positive and negative node, each of said full bridge inverter stages having a voltage supporting device electrically connected in a parallel relationship between said positive node and said negative node and a direct current (DC) source connected between the positive and negative nodes; at least one stacked inverter phase, each stacked inverter phase having a plurality of said full bridge inverter stages, each of said full bridge inverter stages in each stacked inverter phase interconnected in a series relationship with said secondary node of one of said full bridge inverter stages connected to said primary node of another full bridge inverter, said series interconnection defining a first full bridge inverter stage and a last full bridge inverter stage, each phase having an input node at said primary node of said first full bridge inverter stage and an output node at said secondary node of said last full bridge inverter stage; a local controller coupled to each full bridge inverter stage providing the control signals to each full bridge inverter stage to output an approximate nearly sinusoidal voltage waveform; and a system controller which communicating with each local controller; the system controller generating system control signals for configuration, synchronization, activation, deactivation and operating mode selection of said local controller.

14 Claims, 11 Drawing Sheets

(51) Int. Cl.
*H02M 7/48* (2007.01)
*H02M 1/00* (2007.01)

(56) References Cited

U.S. PATENT DOCUMENTS

| | | | |
|---|---|---|---|
| 7,643,319 | B2 | 1/2010 | Wagoner |
| 7,796,412 | B2 | 9/2010 | Fornage |
| 7,962,249 | B1* | 6/2011 | Zhang et al. ............... 700/295 |
| 8,089,178 | B2 | 1/2012 | Spanoche et al. |
| 8,089,785 | B2 | 1/2012 | Rodriguez |
| 8,310,101 | B2 | 11/2012 | Amaratunga et al. |
| 2005/0127853 | A1 | 6/2005 | Su |
| 2005/0139259 | A1 | 6/2005 | Steigerwald et al. |
| 2009/0284998 | A1 | 11/2009 | Zhang et al. |
| 2011/0012429 | A1 | 1/2011 | Fornage |
| 2012/0091817 | A1* | 4/2012 | Seymour et al. .............. 307/82 |
| 2012/0126623 | A1* | 5/2012 | Koehl .......................... 307/76 |

FOREIGN PATENT DOCUMENTS

| | | |
|---|---|---|
| JP | 2009290919 A | 10/2009 |
| KR | 1020120130165 A | 11/2012 |
| WO | WO2010037393 A1 | 4/2010 |
| WO | WO2011085259 A3 | 7/2011 |

OTHER PUBLICATIONS

Author: Abdul Rahiman Beig et. al., Title: "A novel fifteen level inverter for photovoltaic power supply system", Symposium: "Industry Applications Conference, 2004. 39th IAS Annual Meeting. Conference Record of the 2004 IEEE (vol. 2 )", Date: Oct. 3-7, 2004, pp. 1165-1171 vol. 2, Print ISBN: 0-7803-8486-5, Publisher: IEEE, Location: Seattle, WA.

Author: O. Alonso et. al., Title: "Cascaded H-Bridge Multilevel Converter for Grid Connected Photovoltaic Generators with Independent Maximum Power Point Tracking of each Solar Array", Symposium: "Power Electronics Specialist Conference, 2003. PESC '03. 2003 IEEE 34th Annual (vol. 2 )", Date: Jun. 15-19, 2003, pp. 731-735 vol. 2, Print ISBN: 0-7803-7754-0, Publisher: IEEE, Location: Acapulco, Mexico.

Author: S. Rivera, Title: "Cascaded H-Bridge Multilevel Converter Multistring Topology for Large Scale Photovoltaic Systems", SYMPOSIUM: "Industrial Electronics (ISIE), 2011 IEEE International Symposium on", Date: Jun. 27-30, 2011, pp. 1837-1844, Print ISBN: 978-1-4244-9310-4, Publisher: IEEE, Location: Gdansk, Poland.

Author: Fang Zheng Peng et. al., Title: "A Multilevel Voltage-Source Inverter with Separate DC Sources for Static Var Generation", SYMPOSIUM: 'Industry Applications, IEEE Transactions on (vol. 32 , Issue: 5 ), Date: Oct. 8-12, 1995, pp. 2541-2548 vol. 3, Print ISBN: 0-7803-3008-0, Location: Orlando, FL.

Author: Zhongyi He. et. al., Title: "Pre-synchronization control for parallel inverters based on power line communication", SYMPOSIUM: "Power Electronics Specialists Conference, 2008. PESC 2008. IEEE", Date: Jun. 15-19, 2008, pp. 3243-3247, Print ISBN: 978-1-4244-1667-7, Location: Rhodes, Greece.

Author: Chapman et al., Title: "Photovoltaic AC Module Composed of a Very Large Number of Interleaved Inverters", Symposium: "Applied Power Electronics Conference and Exposition (APEC), 2011 Twenty-Sixth Annual IEEE", Date: Mar. 6-11, 2011, pp. 976-981, Print ISBN: 978-1-4244-8084-5, Publisher: IEEE, Location: Fort Worth, TX.

Author: Abdul Rahiman Beig et al., Title: "A novel fifteen level inverter for photovoltaic power supply system", Symposium: "Industry Applications Conference, 2004. 39th IAS Annual Meeting. Conference Record of the 2004 IEEE (vol. 2)", Date: Oct. 3-7, 2004, pp. 1165-1171 vol. 2, Print ISBN: 0-7803-8486-5, Publisher: IEEE, Location: Seattle, WA.

Author: O. Alonso et al., Title: "Cascaded H-Bridge Multilevel Converter for Grid Connected Photovoltaic Generators with Independent Maximun Power Point Tracking of each Solar Array", Symposium: "Power Electronics Specialist Conference, 2003. PESC '03. 2003 IEEE 34th Annual (vol. 2)", Date: Jun. 15-19, 2003, pp. 731-735 vol. 2, Print ISBN: 0-7803-7754-0, Publisher: IEEE, Location: Acapulco, Mexico.

Acapulco, Mexico Author: S. Rivera, Title: "Cascaded H-Bridge Multilevel Converter Multistring Topology for Large Scale Photovoltaic Systems", Symposium: "Industrial Electronics (ISIE), 2011 IEEE International Symposium on", Date: Jun. 27-30, 2011, pp. 1837-1844, Print ISBN: 978-1-4244-9310-4, Publisher: IEEE, Location: Gdansk, Poland.

Author: Fang Zheng Peng et al., Title: "A Multilevel Voltage-Source Inverter with Separate DC Sources for Static Var Generation", Symposium: "Industry Applications, IEEE Transactions on (vol. 32, Issue: 5)", Date: Oct. 8-12, 1995, pp. 2541-2548 vol. 3, Print ISBN: 0-7803-3008-0, Location: Orlando, FL.

Author: Zhongyi He et al., Title: "Pre-synchronization control for parallel inverters based on power line.communication", Symposium: "Power Electronics Specialists Conference, 2008. PESC 2008. IEEE", Date: Jun. 15-19, 2008, pp. 3243-3247, Print ISBN: 978-1-4244-1667-7, Location: Rhodes, Greece.

\* cited by examiner

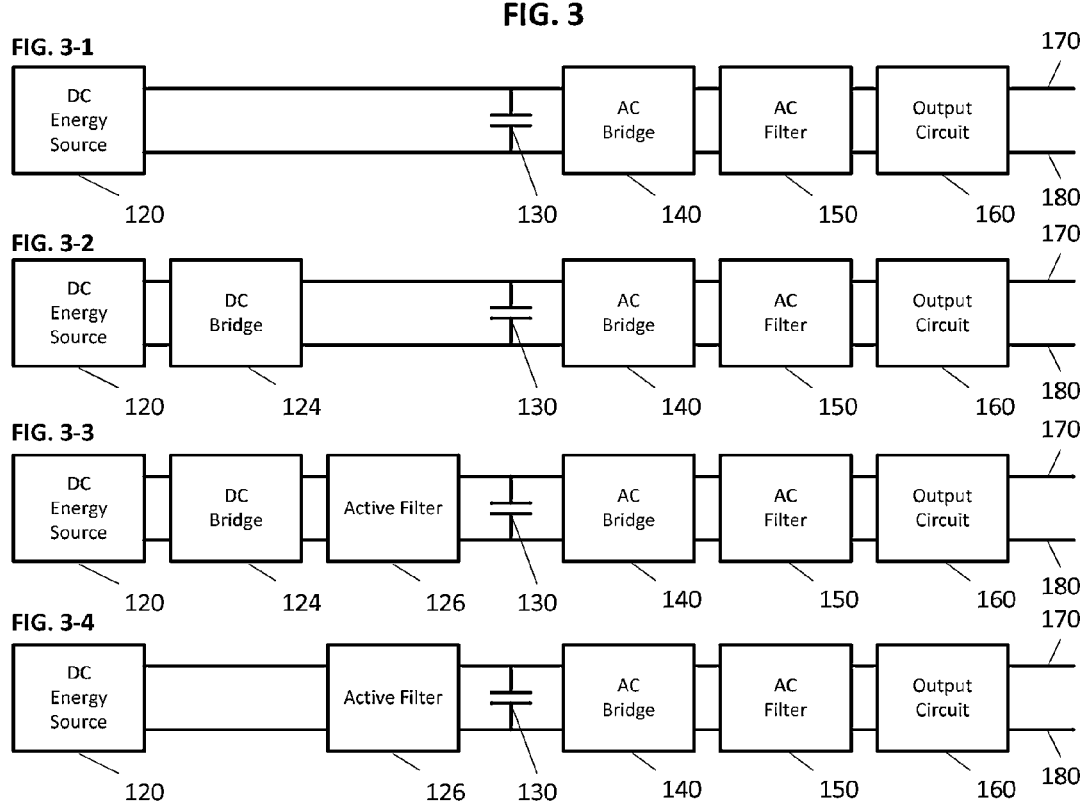

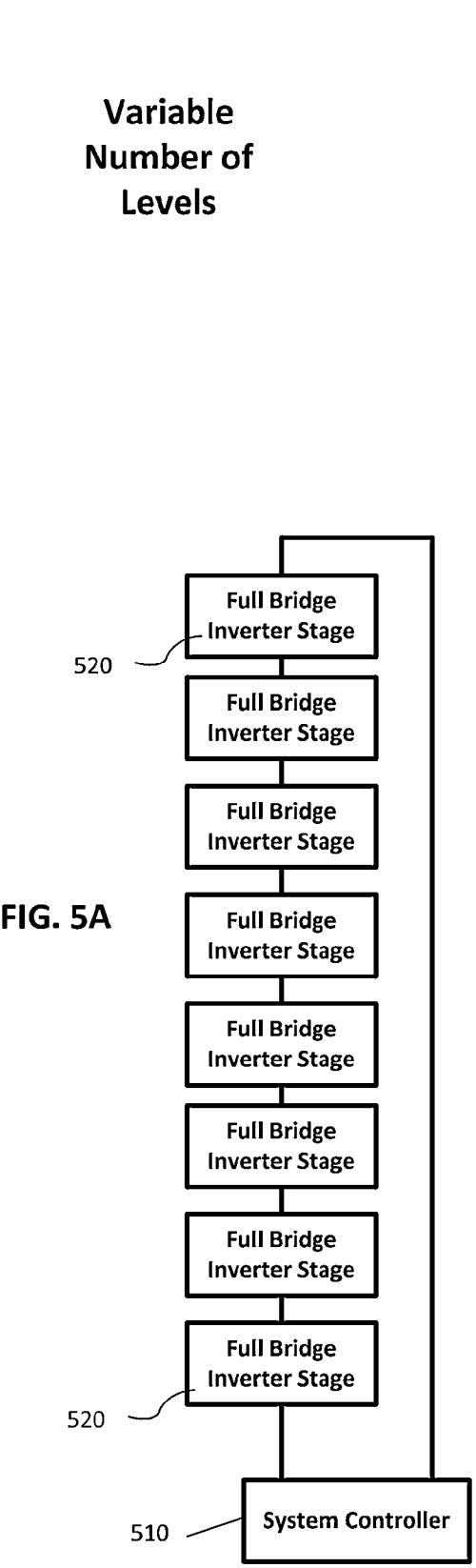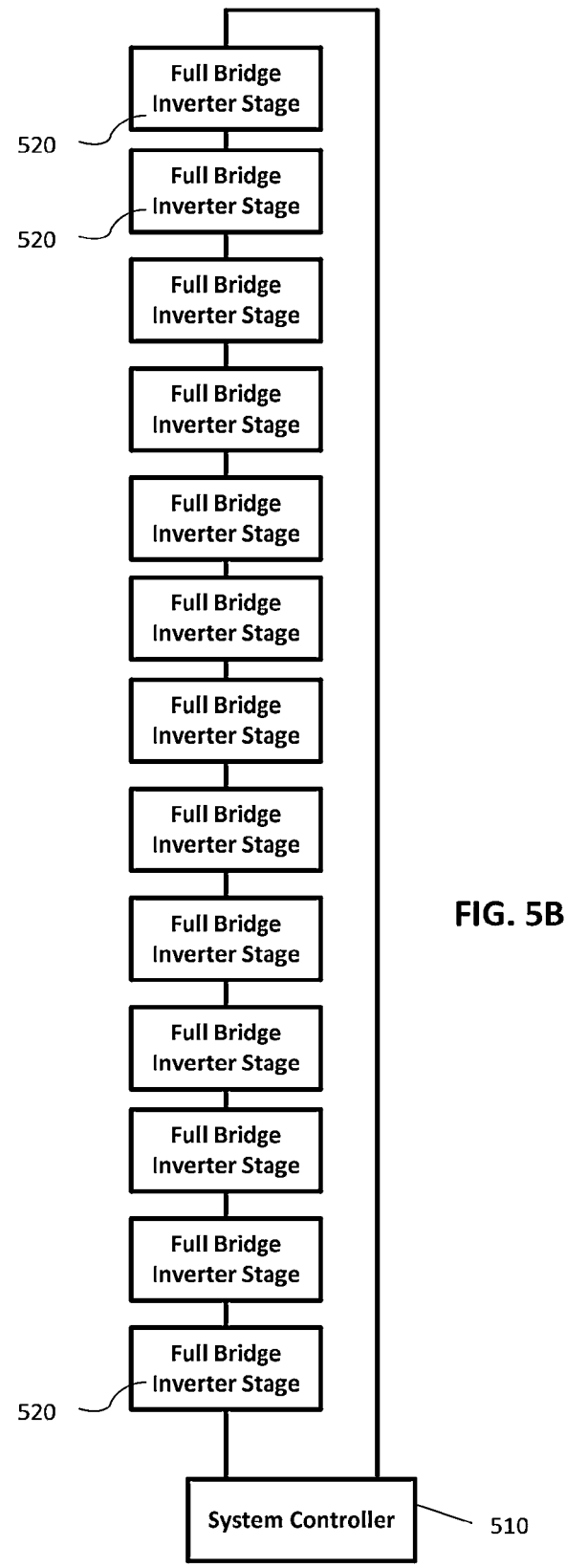

DISTRIBUTED VOLTAGE SOURCE INVERTERS

The present application is a continuation of Provisional Application Ser. No. 61/576,363 filed Dec. 16, 2011, the content of which is incorporated by reference.

The present invention relates generally to inverters that convert Direct Current (DC) to Alternating Current (AC) from a plurality of distributed Direct Current (DC) sources.

Recent awareness of the impacts of human activities on the earth is driving the development of clean technologies such as photovoltaic (solar) panels. Photovoltaic systems use an inverter that converts Direct Current (DC) from solar cells to Alternating Current (AC) for use by household appliances, for example. A typical photovoltaic array typically has a plurality of sub-arrays, where each sub-array in turn uses individual solar panels. A junction box combines the output of the various sub-arrays to form a DC signal that is supplied to an inverter. The inverter converts the DC to AC and supplies the AC to the power grid. In such a system, the amount of power that is efficiently coupled to the grid is important for the cost recovery of the system. As such, the inverter must be as efficient as possible.

To enhance the overall system efficiency, presently available conventional "micro-inverter" technology used for distributed inversion of a plurality of solar panel Direct Current (DC) sources, couples individual micro-inverters to each solar panel. The AC outputs of such distributed micro-inverters are combined in parallel and coupled to the power grid. Although the use of micro-inverters is more efficient than a single inverter, the conversion efficiency of each individual micro-inverter is typically 95% or less.

SUMMARY

Systems and methods are disclosed with multiple direct current (DC) voltage source inverters to supply power to an alternating current (AC) power system as embodiments of the present invention. The system includes a plurality of full bridge inverter stages, each having a primary node and a secondary node, each of said full bridge inverter stages having positive and negative node, each of said full bridge inverter stages having a voltage supporting device electrically connected in a parallel relationship between said positive node and said negative node and a direct current (DC) source connected between the positive and negative nodes; at least one stacked inverter phase, each stacked inverter phase having a plurality of said full bridge inverter stages, each of said full bridge inverter stages in each stacked inverter phase interconnected in a series relationship with said secondary node of one of said full bridge inverter stages connected to said primary node of another full bridge inverter stage, said series interconnection defining a first full bridge inverter stage and a last full bridge inverter stage, each phase having an input node at said primary node of said first full bridge inverter stage and an output node at said secondary node of said last full bridge inverter stage; a local controller coupled to each full bridge inverter stage providing the control signals to each full bridge inverter stage to output an approximate nearly sinusoidal voltage waveform; and a system controller which communicating with each local controller; the system controller generating system control signals for configuration, synchronization, activation, deactivation and operating mode selection of said local controller.

Implementations of the above system can include one or more of the following. The multiple DC voltage source inverter can have three stacked inverter phases, and they can further be connected in a wye (Y) connection or a delta (Δ) connection. Each full bridge inverter stage incorporates an optional switch to short its output, allowing the stacked phase with the remaining series connected full bridges to operate should one full bridge inverter stage fail. A component can be connected between the positive and negative direct current nodes of said full bridge inverter stage, wherein the component is selected from the group consisting of: capacitors, batteries, fuel cells, photovoltaic cells and biomass cells. A non-isolated switch mode voltage regulation circuit (such as a buck or boost converter) can be placed between the DC power source and the AC bridge of said full bridge inverter stage. An isolated switch mode voltage regulation circuit (such as a forward, push-pull or half bridge) can be connected between the DC power source and the AC bridge of said full bridge inverter stage. An active filter can be incorporated in said full bridge inverter stage to decouple AC current modulation imposed on the DC voltage source when used with current limiting DC sources including photovoltaic cells. Each stacked full bridge inverter stage can operate with different power that the other full bridge inverter stages in the system. A variable number of stacked full bridge inverter stages can be used for each phase. A system controller incorporates at least one switch selectively connecting each stacked inverter phase to the grid. The multiple DC voltage source inverter has a system controller providing a system phase and frequency reference for the system derived from a PLL circuit synchronized to the grid or derived from a local oscillator, with means of transmitting a periodic phase reference synchronization signal to each stacked full bridge inverter stage using a separate wire or by high frequency modulated transmission injected over the power cables connected between the system controller to said series connected full bridge inverter stages; a local controller coupled to each full bridge inverter stage having a detector circuit for recovery of such synchronization signal generated by the systems controller; where said local controller incorporates a phase offset measurement error tolerant PLL circuit. Said system controller calculates and communicates start-up voltage and operating voltage range to each full bridge inverter stage. Said system controller also determines and communicates control commands for activation and deactivation of each full bridge inverter stage. Said system controller can also determine and communicates control commands for activation and deactivation of said voltage source inverter system.

In another aspect, a method for reference angle generation includes detecting grid frequency where a stacked phase will be connected to a grid network; creating and transmitting a periodic phase reference synchronization signal from such detected grid frequency; filtering and detecting such transmitted synchronization signal at each full bridge inverter stage; creating an angle from 0 to 2pi based on such detected synchronization signal; and using proportional, hysteresis or minimum error control methods to generate a modulation signal for said full bridge inverter stages.

In another aspect, a method for inverting a plurality of direct current (DC) voltage signals to approximate a sinusoidal voltage waveform includes calculating AC start up voltage for a plurality of stacked full bridge inverter stages; calculating power and generate a reference DC voltage; averaging said DC voltage levels; comparing said average DC voltage levels with a reference DC voltage; generating a first error signal from said comparison of said average with a reference DC current voltage; comparing an reference DC current with detected AC current levels; generating an reference signal from said first error signal; generating a second error signal from said comparison of said reference with said detected AC current levels; generating a phase modulation signal from said second error signal; detecting an AC line voltage having a period; generating a phase reference signal directly related to said period of said AC line voltage; generating a plurality of firing signals for a plurality of full bridge inverter stages using said phase reference signal and phase modulation signal; and providing a reference table for said modulation index.

In one embodiment, the present invention discloses a method and apparatus for power inversion. In one embodiment, the apparatus comprises full bridge inverter stages, each full bridge inverter stage capable of inverting DC input power to AC output power; and a system controller to manage the full bridge inverter stages inverting DC power to an AC power using at least two cables, wherein the full bridge inverter stages and the system controller are series connected and daisy-chained together using the two cables.

Implementations of the preferred embodiments may include one or more of the following. In one embodiment, the full bridge inverter stage has a DC bridge, an AC bridge, an inversion controller, and a communication transceiver to allow the inversion controller to communicate with the system controller. The full bridge inverter stage can take energy generated by PV panel and optionally provide the PV energy to an optional DC stage. The output of the PV panel can be smoothed by a capacitor. The direct current output from the PV panel is provided to an AC bridge. The AC bridge output is then presented to a filter before it is provided at an output section for providing AC output. The system controller can optionally assign one full bridge inverter stage to operate as a current source, and all the remaining full bridge inverter stages are used as voltage sources. The system can handle a variable number of series connected full bridge inverter stages, where the minimum and maximum number of full bridge inverter stages per system is determined by the aggregate grid voltage across all the series connected full bridge inverter stages, the maximum AC output voltage of each full bridge inverter stage, and the maximum AC output current of each full bridge inverter stage. The separate series connected full bridge inverter stage groups can be configured as a 3-phase inversion system in one embodiment.

Advantages of the preferred embodiments may include one or more of the following. The system requires only 2 wires for each inverter, for serial connection. The system is highly efficient, yet scalable. The system can be configured for single or three phase operation. The system is highly reliable, small form factor, and very light weight.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A shows the Alternating Current (AC) interconnection cables and connectors for an exemplary conventional micro-inverter power inversion system that utilizes a plurality of parallel connected micro-inverters, while

FIG. 3-1 through FIG. 3-4 are block diagrams of exemplary full bridge inverter configurations in accordance with the present invention.

FIG. 3-5 shows exemplary circuit implementations of the various full bridge inverter sub-systems in accordance with the present invention.

FIG. 4 shows an exemplary system of the present invention with three full bridge inverter stages.

FIG. 5A shows an exemplary system of the present inversion with 8 full bridge inverter stages.

FIG. 5B shows an exemplary system with 13 full bridge inverter stages of the present invention.

DESCRIPTION

Figure 1A:
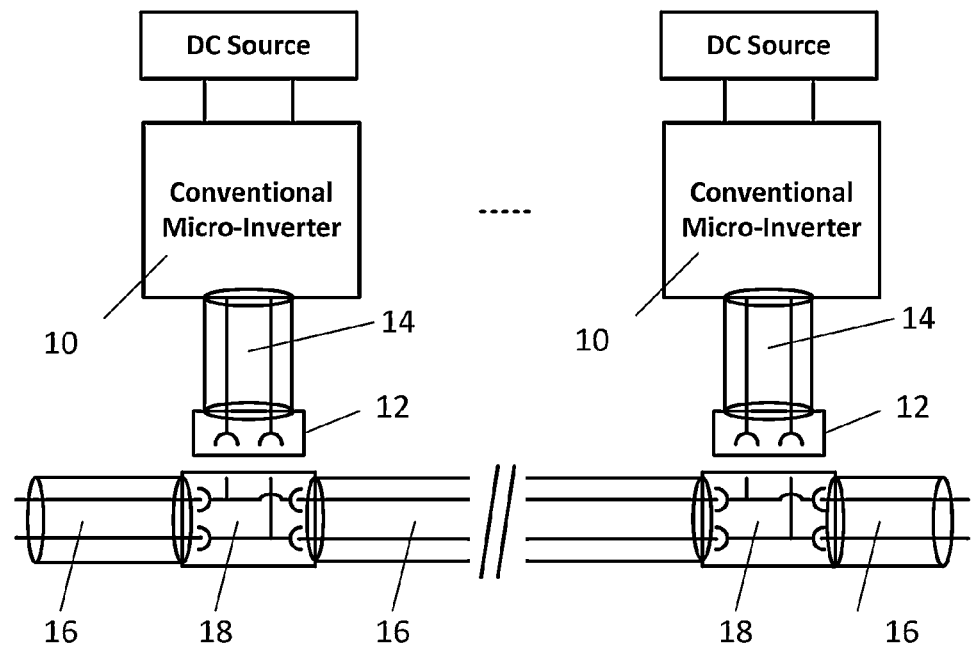
Figure 1B:
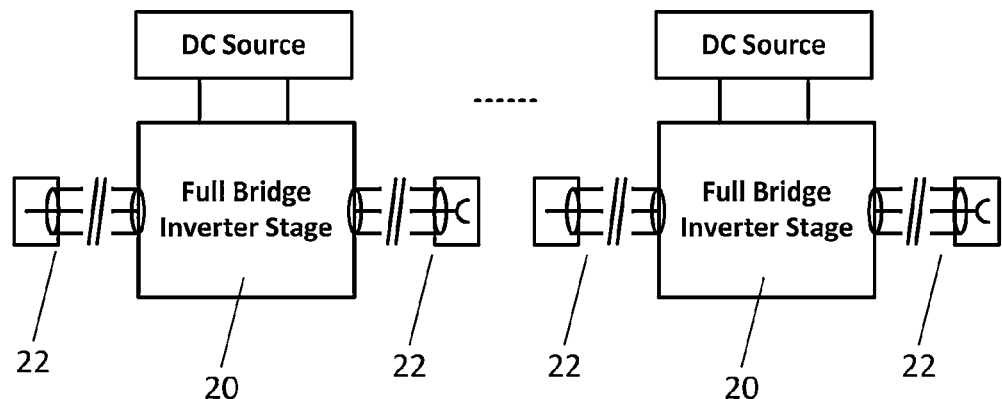
FIG. 1B shows one exemplary embodiment of the simplified cable and connector structure enabled by the present invention.

FIG. 1A shows the alternating current interconnection cables and connectors for an exemplary conventional micro-inverter power inversion system. This diagram only portrays one variation of the myriad of possible cable and connector configurations. The conventional power generation system has a micro-inverter 10 with a plurality of custom cables and connectors 12, 14, 16 and 18. These micro-inverters are connected in parallel directly across the grid. The system of FIG. 1A requires more complex multi-conductor cables/connectors than those required by the proposed system. In this exemplary embodiment, a full bridge inverter stage 20 uses two standard single conductor cables and connectors 22. In contrast with the conventional cabling and connector system of FIG. 1A, only two single conductor cables/connectors are used, thus reducing connector and cable material costs and labor costs in installing the system of FIG. 1B. Each full bridge inverter stage of the present invention provides an output AC power to a series connected AC circuit. The AC circuit terminates into a system controller. The system controller generally connects together the outputs from all the series connected full bridge inverter stages to form a single AC feed to an electric panel.

Figure 2:
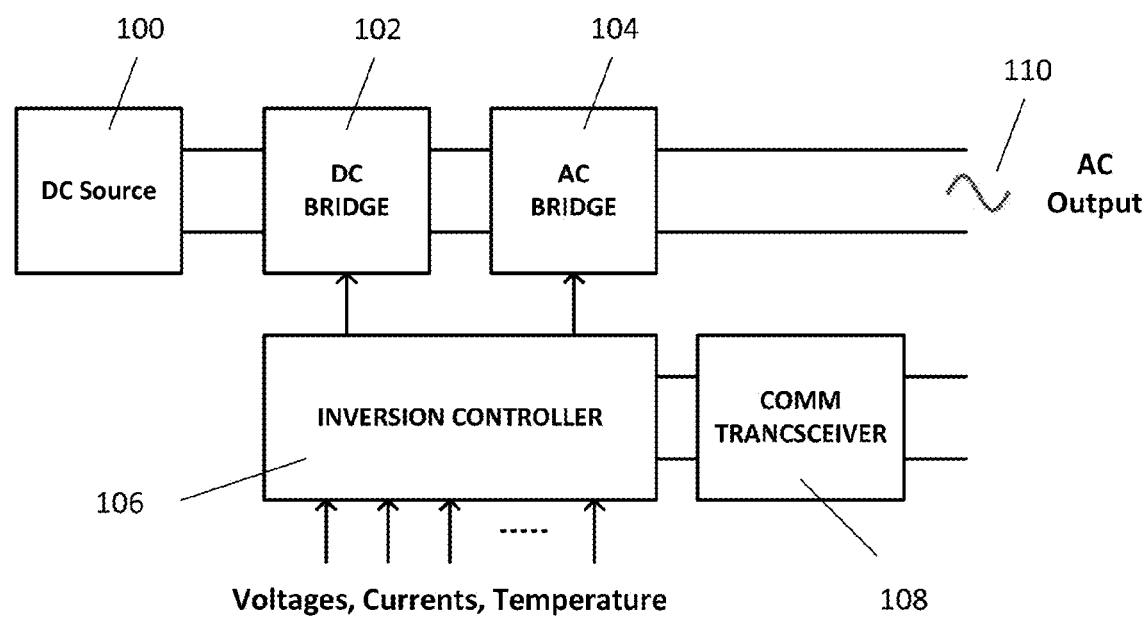
FIG. 2 shows an exemplary integrated circuit implementation of a full bridge inverter stage of the present invention.

FIG. 2 shows an exemplary integrated circuit implementation of the key functions of a full bridge inverter stage of the present invention. A photovoltaic (PV) solar energy receiver or panel 100 has a plurality of solar cells disposed in a lamination stack on a top surface of a substrate. Suitable solar cells may include, for example, conventional single or multi-crystalline silicon solar cells, thin film (e.g., amorphous silicon, cadmium telluride, or copper indium gallium selenide) solar cells, and III-V solar cells. Although a single string of solar cells can be arranged in a single row, in other variations more or fewer solar cells may be used, and they may be arranged in one, two, or more parallel rows along the substrate. In addition, two or more PV panels 100 may be positioned end-to-end and electrically and fluidly coupled to provide a larger receiver.

Each PV panel 100 is coupled to a full bridge inverter stage that inverts DC power generated by the PV panel 100 into AC power. The full bridge inverter stages of the present invention meter out current that is in-phase with the AC grid current and generate such current with low distortion. This is done using a plurality of integrated circuits. In one embodiment, the output of the PV panel 100 is regulated by a DC bridge 102, whose output is provided to an AC bridge 104. The output of the AC bridge 104 is connected in series with other full bridge inverter stages per this invention. The DC bridge 102 and AC bridge 104 are controlled by an inversion controller 106, which communicates with the system controller through a communication transceiver 108. The communication transceiver 108 can be a powerline communication transceiver, a wireless communication transceiver such as a Zigbee transceiver, or another form of communication transceiver.

An electric panel can be used to connect the power from a plurality of series connected full bridge inverter stages through the system controller eventually to the utility grid and, in some applications, to appliances within a user's facility. For example, in a home, the electric panel is a well-known AC distribution hub having various circuit breakers and/or fuses to distribute electricity to various circuits within the home. The electric panel is coupled through the electric meter to the power grid. The meter determines the amount of power supplied to the grid, such that the owner of the PV panel 100 can be compensated for supplying electricity.

The full bridge inverter stages invert DC to AC in accordance with the control and switching signals produced by the inversion controller 106. The inversion controller 106 produces the control and switching signals in response to the current and voltage samples of the DC and AC signals. Consequently, the full bridge inverter stages may be optimally controlled to utilize a particular mode of operation to correspond to the present state of the DC and AC signals, i.e., to optimally match the AC output to the phase of the power grid such that the AC power is efficiently coupled to the power grid extracting the maximum direct current power available from the PV panel.

Figures 3, 4, 5:
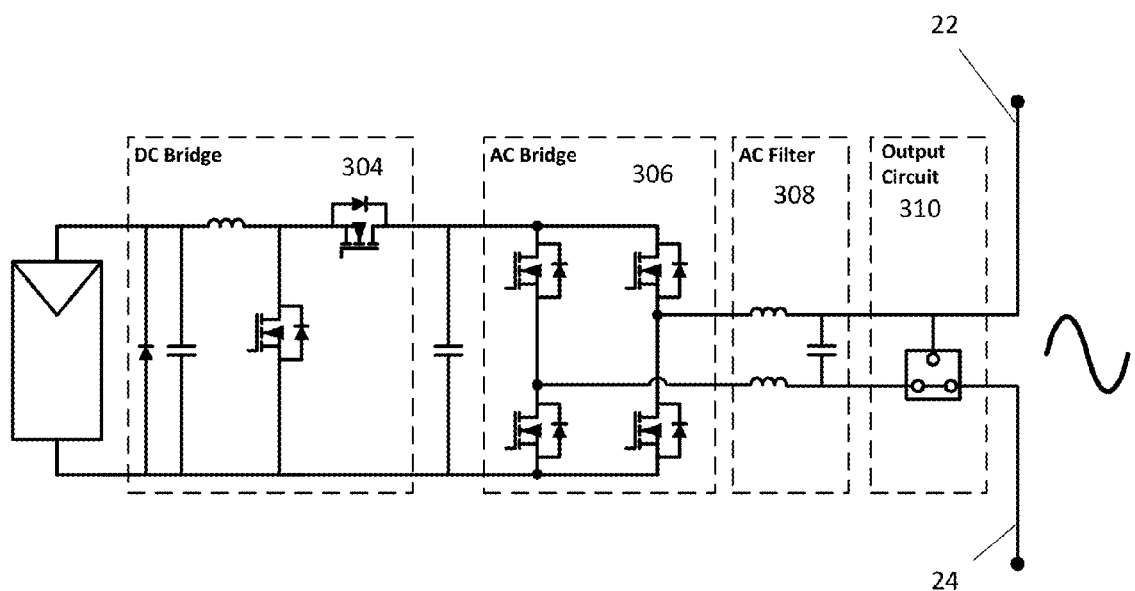
Figure 4:
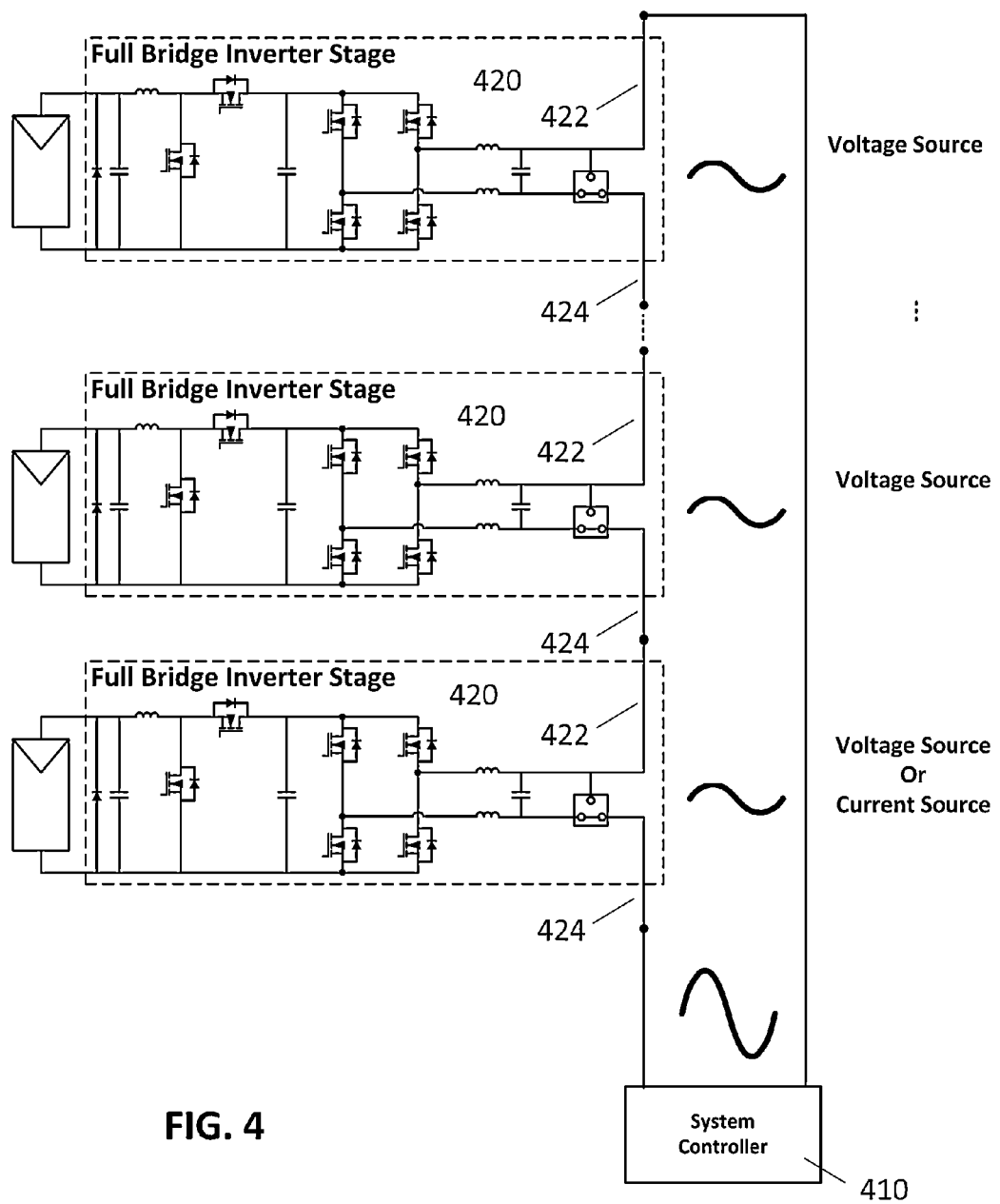

The structure and function of the full bridge inverter stages of the present invention are discussed next. FIG. 3-1 through FIG. 3-4 are block diagrams of exemplary full bridge inverter stages in accordance with the present invention. The most basic embodiment of the full bridge inverter stage is shown in FIG. 3-1. A DC energy source 120 provides input power to the AC bridge 140. The decoupling capacitor 130 filters switching ripple from the AC bridge as well as lower frequency ripple from the AC grid. The AC bridge 140 is PWM controlled in known manner to provide an approximately sinusoidal output signal. The AC filter 150 is a low pass filter that filters out the high frequency PWM harmonic noise. The output circuit 160 implements an optional disconnect relay. Series AC connection are terminals 170 and 180, An additional embodiment with a DC bridge 124 is shown in FIG. 3-2. The DC bridge can be either a boost or buck power conversion circuit. A boost circuit would be used to increase the operating voltage across the DC link capacitor 130 thereby allowing for a larger peak to peak AC operating voltage across the AC output terminals. A larger peak to peak AC operating voltage allows for fewer full bridge inverter stages to be used to generate a given stacked AC output voltage. A buck power conversion circuit would be used to reduce the operating voltage across the DC link capacitor. This would enable use of lower voltage rating transistors in the AC bridge thereby reducing cost, increasing efficiency of the circuit, and increasing number of the stacked full bridge inverter stages.

A further embodiment in FIG. 3-3 implements an active filter 126 that maintains a constant current from the PV panel with minimal capacitive storage required to decouple the AC ripple current at double the line frequency to obtain maximum power from the PV panel.

The embodiment in FIG. 3-4 includes an active filter 126 to reduce the value, size, and cost of the DC link capacitor without use of a separate DC bridge.

Another block diagram of an exemplary full bridge inverter stage in accordance with the present invention shown in FIG. 3-5 is discussed next. DC energy is supplied by a DC electric source which can be a solar panel, a battery, or a vehicular DC generator, among others. The output of the DC electric source is provided to an exemplary DC bridge circuit 304, whose output is smoothed by a filter capacitor and provided to an exemplary AC bridge circuit 306. The output of the AC bridge circuit is provided to an exemplary AC filter circuit 308, and the resulting output circuit 310 is connected to the output of other full bridge inverter stages using cables 22 and 24.

FIG. 4 shows an exemplary system with three full bridge inverter stages 420 interconnected in series using cables and connectors 422 and 424, respectively. The full bridge inverter stages 420 are controlled by their own local inversion controller. A system controller 410 provides grid synchronization, start up and shutdown commands, and monitor functionalities. One full bridge inverter stage 420 may functions as a current source while the remaining full bridge inverter stages 420 operate as voltage sources.

FIG. 5A shows an exemplary system for handling 8 full bridge inverter stages. In this system, eight full bridge inverter stages 520 are connected to a system controller 510. FIG. 5B shows an exemplary system where the system controller 510 is connected to 13 full bridge inverter stages 520.

Figure 5C:
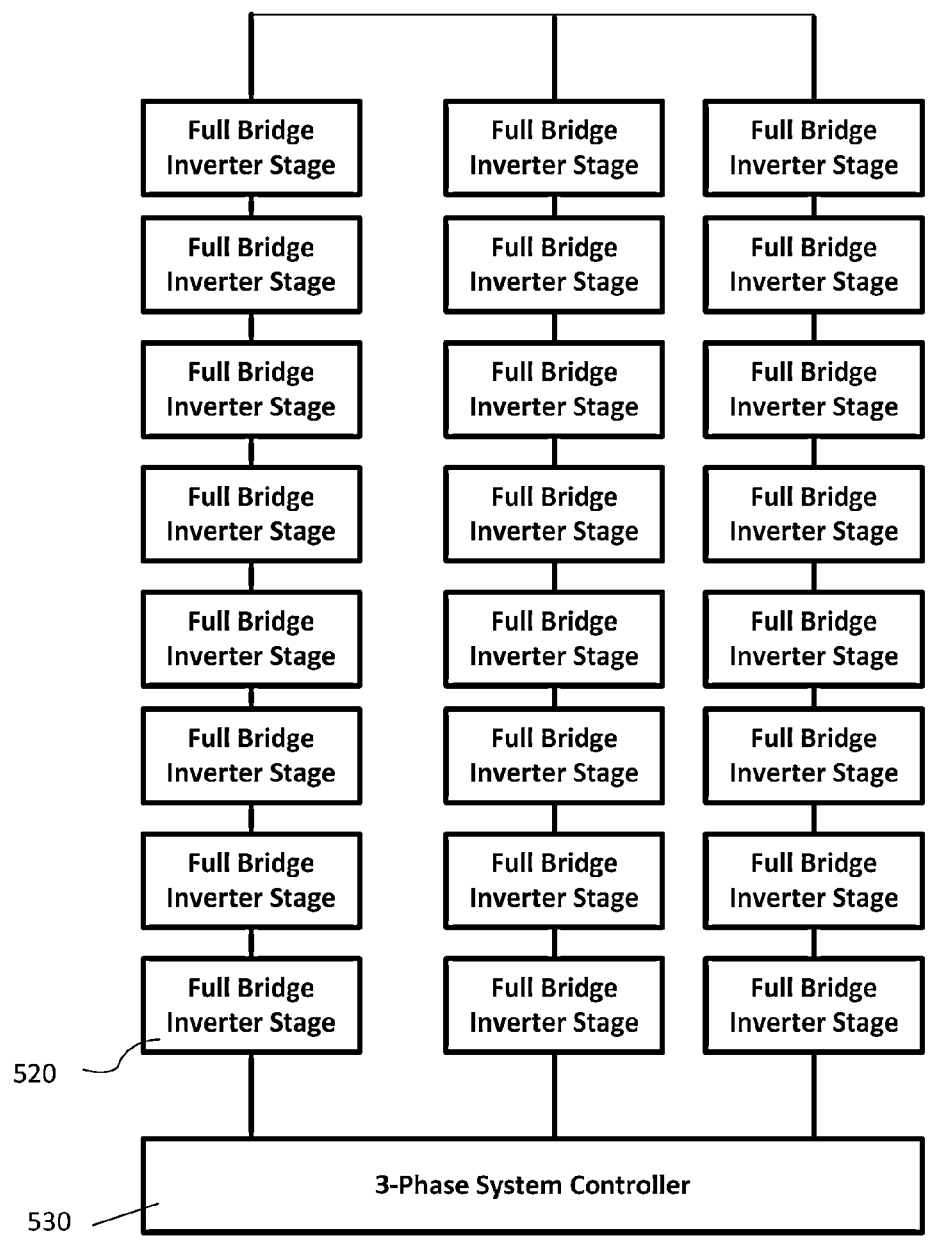
FIG. 5C shows an exemplary three-phase system of the present invention.

FIG. 5C shows an exemplary three-phase system. Each phase is powered by a plurality of series connected full bridge inverter stages 520 that are connected to a 3-phase system controller 530. The system controller needs to provide a synchronization signal to each full bridge inverter stage; there is 120 degree phase between each phase in three phase system.

Figure 6:
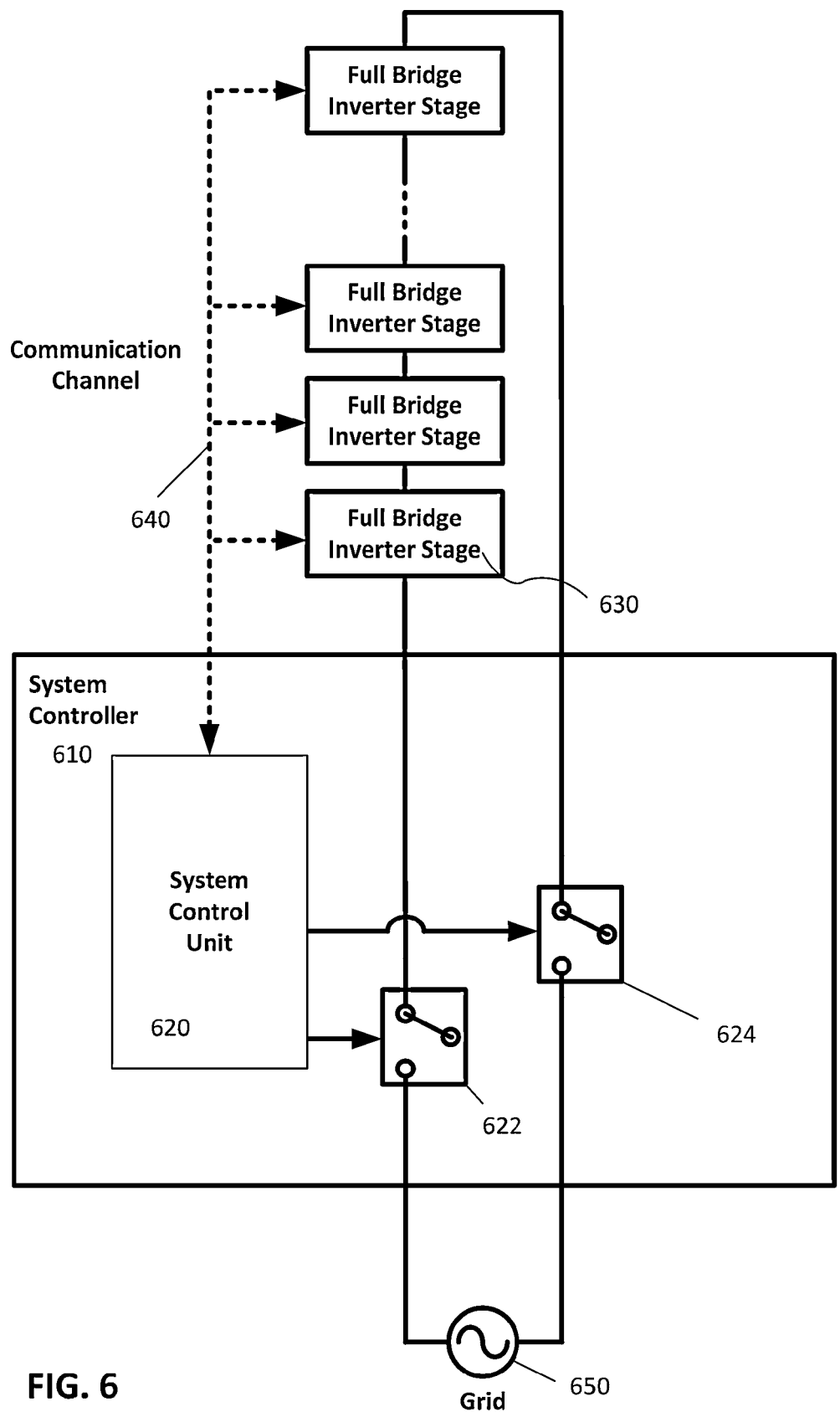
FIG. 6 shows an exemplary control and communication system architecture for controlling and synchronizing a system with a plurality of series connected full bridge inverter stages of the present invention.

FIG. 6 shows a system level exemplary architecture for controlling a plurality of series connected full bridge inverter stages. A system control unit 620 controls relays 622 and 624 that control supply of generated power to an electricity grid 650. The system control unit 620 receives communications from full bridge inverter stages 630 over a communication channel 640. The communication channel 640 can be wired such as the power line communication channel or can be wireless such as Zigbee transceivers, among others. The system controller also implements algorithms detecting abnormal grid conditions and methods of disconnecting the system of the present invention from the grid by controlling relays 622 and 624. In addition, the system controller will provide grid synchronization signal to each full bridge inverter stage.

Figure 7:
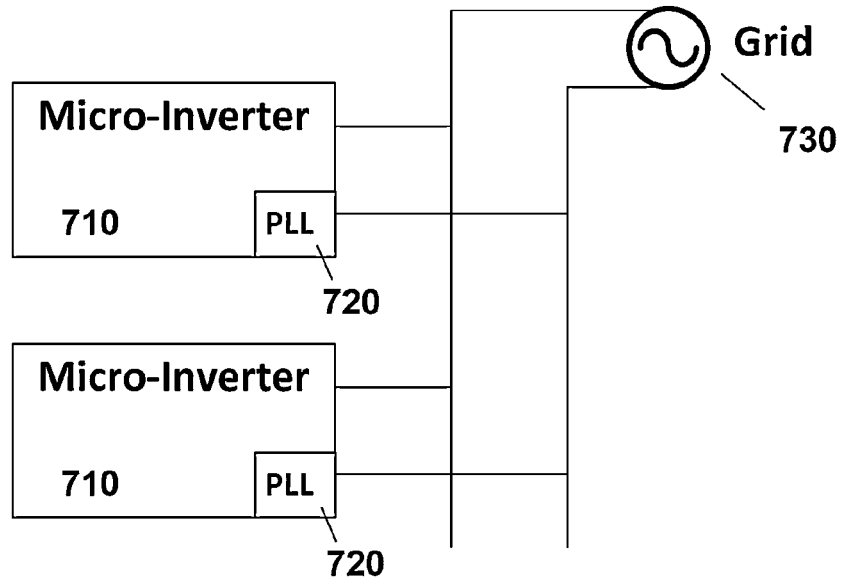
FIG. 7 shows an exemplary connection-to-grid synchronization architecture for conventional micro-inverters.

FIG. 7 shows one exemplary conventional micro-inverter architecture. Grid synchronization is a requirement for any grid connected inverter. Previous art micro-inverters 710 are directly connected across the utility grid 730, which is a stiff voltage source. Standard phased locked loop (PLL) algorithms 720 can reliably be used with stiff voltage sources to synchronize prior art inverters with the grid phase and frequency. The full bridge inverter stages of the present invention are not connected directly across the utility grid. The local voltage across the output terminals of each series connected full bridge inverter stage is not a stiff voltage source. As a result, each series connected full bridge inverter stage is not capable to reliably synchronize its output phase and frequency to the utility grid using conventional PLL based synchronization methods. The present invention implements a novel, distributed synchronization method to realize reliable phase and frequency synchronization for each series connected full bridge inverter stage with the utility grid. The system controller of the present invention is connected across the utility grid. The system controller can thus achieve robust phase and frequency synchronization with the utility grid using conventional PLL algorithms. In grid interactive systems, the system controller PLL function generates a periodic phase synchronization signal for the system of the present invention at the utility grid frequency that is transmitted to each series connected full bridge inverter stage. In off-grid systems, the system controller itself is the source of the system frequency.

Figure 8:
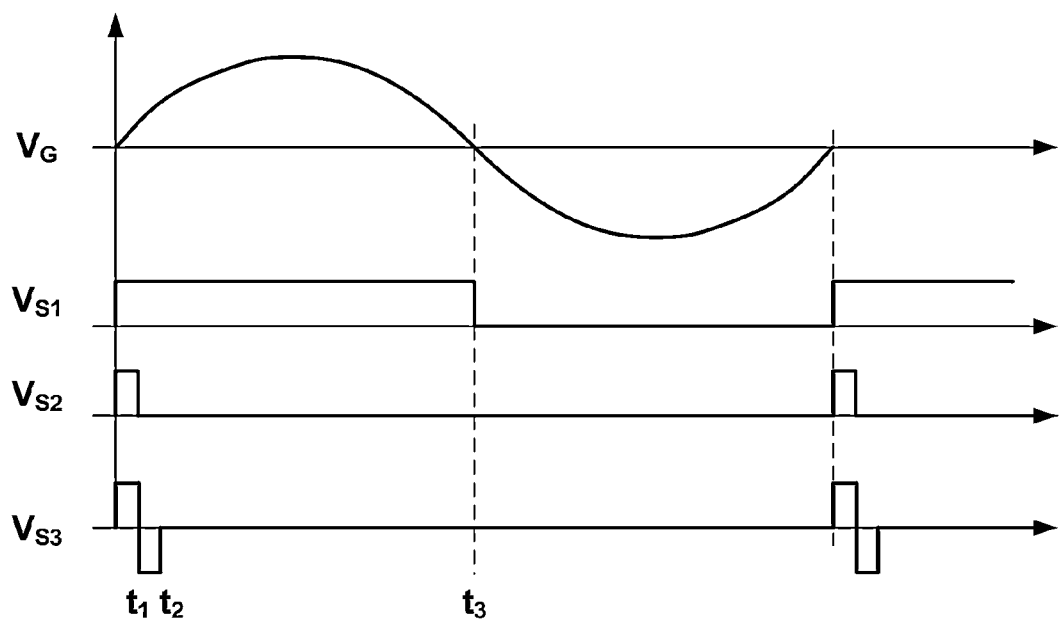
FIG. 8 shows exemplary synchronization signals sent by the system controller to each full bridge inverter stage of the present invention.
Figure 9:
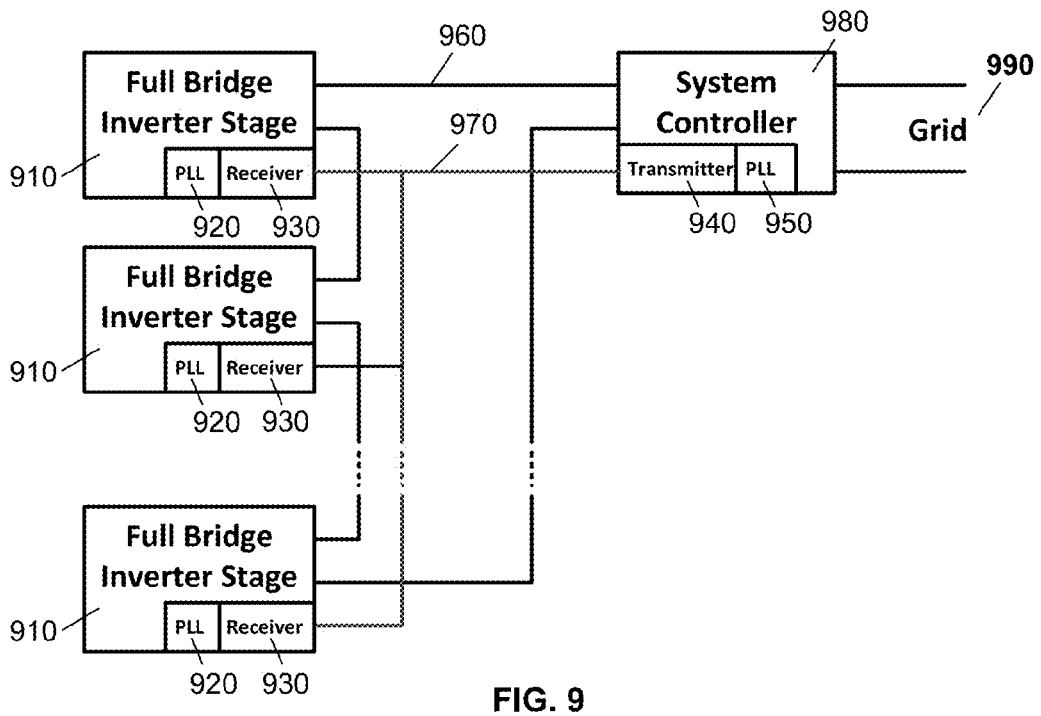
FIG. 9 shows an exemplary synchronization architecture of the present invention using synchronization signals sent by separate wires.

FIG. 8 shows examples of three possible embodiments of synchronization signals Vs1, Vs2, and Vs3 sent by the system controller to each full bridge inverter stage. Transmission of the synchronization signals are timed by the system controller to be phase aligned with the grid phase as detected by the system controller's 980 PLL circuit 950 as shown in FIG. 9 using measured samples of the grid voltage Vg. Vs1 is a possible shape for a synchronization signal that can be transmitted to each series connected full bridge inverter stage 910 using a separate wire 970. Each series connected full bridge inverter stage 910 will have a receiver circuit 930 to recover the sent synchronization signal and its own digital PLL 920 to create proper local synchronization to the grid phase and frequency as shown in FIG. 9. A disadvantage of this approach is that it requires a separate wire 970, which can add cable and connector cost to the system.

The preferred way in photovoltaic applications is to use the existing power wires between the series connected full bridge inverters and the system controller. A low voltage, high frequency signal (Vs2 and Vs3) can be injected by the system controller into the power line that serially connects to the utility grid through the system controller and then recovered in each series connected full bridge inverter stage. Vs2, Vs3 are signals at 3-4 orders of magnitude higher frequency than the grid frequency. To eliminate noise the synchronization signal receiver in each stacked micro-inverter may need to be band-pass filtered to suppress out-of-band noise and ensure proper synchronization signal recovery. Vs2 and Vs3 are exemplary synchronization signals. The phase offset, frequency, length, modulation, and periodicity of the synchronization signal can be different in other obvious embodiments.

Figure 10:
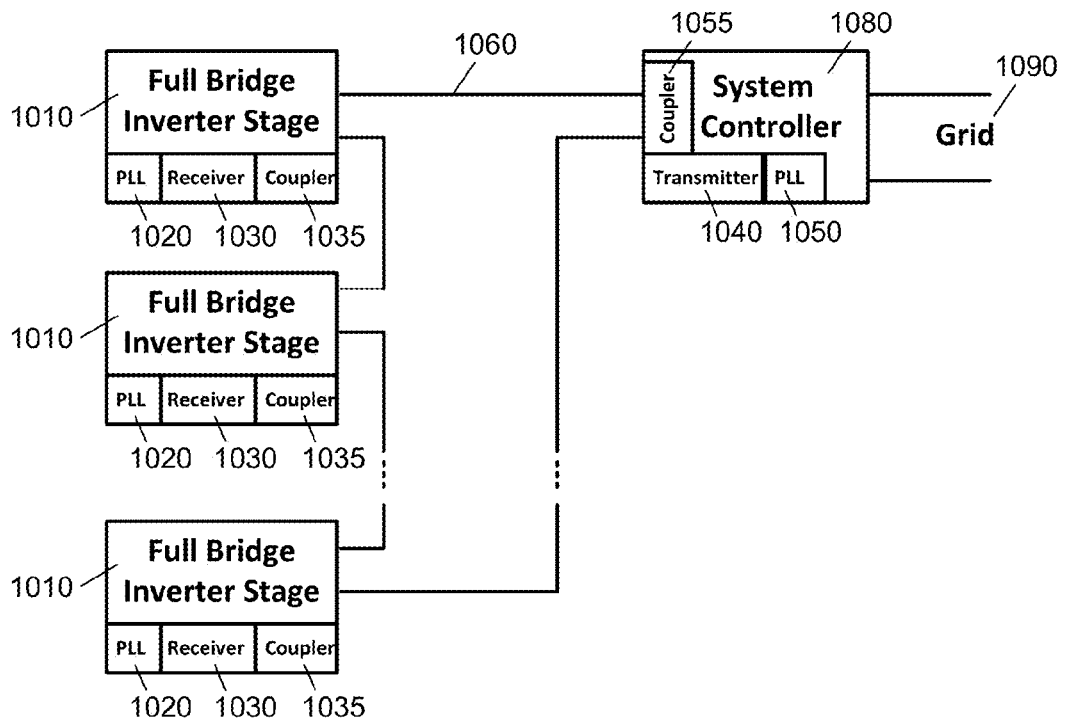
FIG. 10 shows an exemplary synchronization architecture of the present invention using synchronization signals injected into power cables.

As discussed below, the synchronization signal of the present invention must be transmitted by the system controller closely phase aligned with the grid waveform. In the current example in FIG. 8, the synchronization signal is transmitted around each rising edge zero crossing of the grid voltage. It could just as well be sent at the peak voltage of each grid cycle or any other determined time in other exemplary implementations. A coupling circuit 1055 shown in FIG. 10 is required to inject the high frequency synchronization signal to the power cable 1060 in the system controller 1080 and to receive 1035 the signal in each full bridge inverter stage 1010. The coupling circuit can be a transformer or capacitor that is high impedance for low frequency and low impedance for the high frequency synchronization signal.

Figure 11:
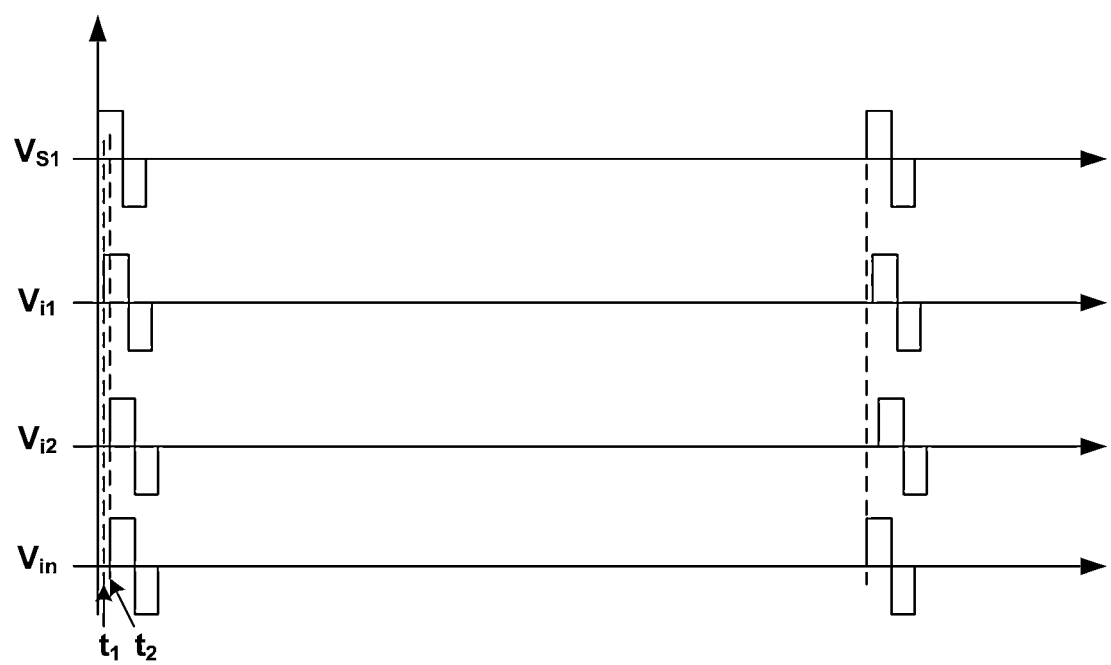
FIG. 11 shows an exemplary synchronization signal propagation delay and detection circuit delay variation between different series connected full bridge inverter stages of the present invention.

FIG. 11 shows exemplary signal recovery at each series connected full bridge inverter stage. As shown therein, the recovered synchronization signal in each series connected full bridge inverter stage (Vi1 to Vin) will be delayed compared to the signal transmitted by the system controller (Vs1). The amount of delay will be dependent on distance (particular full bridge inverter stage to system controller) and component tolerances in the band-pass filter and receiver circuit. The delay could vary anywhere from few microseconds to tens of microseconds. This delay variability requires a special PLL method in each series connected full bridge inverter stage to generate a proper local phase reference signal.

In contrast, the conventional approach is to transfer current into synchronous frame d-q and run a proportional integral (PI) control loop to eliminate any delay between voltage and current (d should be zero). Strong integral loop will make this delay negligible.

In the example of the present invention given in FIG. 11, one full bridge inverter stage has a delay of t1 and produce current aligned with t1 delay. A second full bridge inverter stage will detect phase shift from t1 to t2 and will try to change its reference to move current to t2 delay. As a result both full bridge inverter stages will push their local reference signal to opposite sides in order to get current aligned to t1 and t2 delay respectively. Because the current is the same (series connection), both full bridge inverter stages will not be able to achieve zero phase shift and the system will not be able to operate properly. The present invention introduces a novel control method to solve this problem.

In one embodiment, each full bridge inverter stage of the present invention makes a modification to its local reference signal to tolerate synchronization signal recovery delay variations in each series connected full bridge inverter stage. Since 10 us is only $\frac{1}{10}^{th}$ of degree for grid frequency this error is negligible. In various implementations, each full bridge inverter stage of the present invention can use one of the following exemplary control methods to achieve robust grid phase and frequency synchronization:

1) Proportional control loop: this controller allows error. Potential issue is that the amount of error is too big
2) A proportional integral loop with very small integral gain will also tolerate possible phase errors.
3) A proportional integral control loop with allowed minimal error. This means if the error is smaller than maximum detection error (say 10 us) it will be treated as zero.
4) A hysteresis controller that can move the reference signal corresponding to the amount of phase error (+/−10 us)

Next, system start-up and shutdown of the present invention will be discussed. The important steps taken by the system controller in starting and shutting down the system includes:

1) Checking for sufficient number of full bridge inverter stages required to build up the grid voltage are ready to operate
2) The system controller sends a periodic synchronization signal to all full bridge inverter stages
3) The system controller confirms that all full bridge inverter stages report successful synchronization
4) The system controller closes its relay and connects the system to the grid. The grid voltage will be shared across output filter capacitors of each series connected full bridge inverter stage
5) The system controller sends a start-up command to the series connected full bridge inverter stages 6) The full bridge inverter stages start in voltage mode and as soon as they detect current flowing through the series connected AC circuit they switch to power mode and start providing maximum power available from each of their local direct current power source In another implementation, the system controller first starts the full bridge inverter stages in voltage mode, to get the AC string voltage equal to the grid voltage after which the system controller closes its relay and connects the string to the grid. Once current flow is detected by the full bridge inverter stages, they will switch to power mode.

For shutdown, the system controller will detect a low power level and issue a shutdown command to all the full bridge inverter stages. The full bridge inverter stages will turn their AC bridges and stop producing power. The current will drop to near zero and at that point the system controller can open its relays and disconnect the system from grid.

The system controller is the only device in the system that is directly connected to the grid and also the only device in the system that has a ground reference. The system controller must therefore be present in every system to comply with applicable regional and national regulatory safety requirements such as:

1) Abnormal grid voltage detection and automatic disconnection
2) Abnormal grid frequency detection and automatic disconnection
3) Anti-islanding detection and automatic disconnection
4) Ground-fault detection and disconnection
5) Possible over current system protection While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A multiple direct current (DC) voltage source inverter to supply power to an alternating current (AC) power system, comprising:
  a plurality of full bridge inverter stages, each having a primary node and a secondary node, each of said full bridge inverter stages having positive and negative node, each of said full bridge inverter stages having a voltage supporting device electrically connected in a parallel relationship between said positive node and said negative node and a direct current (DC) source connected between the positive and negative nodes;
  at least one stacked inverter phase, each stacked inverter phase having a plurality of said full bridge inverters, each of said full bridge inverter stages in each stacked inverter phase interconnected in a series relationship with said secondary node of one of said full bridge inverter stages connected to said primary node of another full bridge inverter stage, said series interconnection defining a first full bridge inverter stage and a last full bridge inverter stage, each phase having an input node at said primary node of said first full bridge inverter stage and an output node at said secondary node of said last full bridge inverter stage;
  a local controller coupled to each full bridge inverter stage providing the control signals to each full bridge inverter stage to output a sinusoidal voltage waveform, each local controller coupled to a communication transceiver; and
  one or more switches or relays connected in series between the primary and or secondary conductor if each said stacked inverter phase and the power grid; and
  a system controller communicating with each local controller; the system controller communication transceiver, the system controller generating system control signals for configuration, synchronization, activation, deactivation and operating mode selection of said local controller, and said system controller providing on and off control signals to said switches or relays to prevent reverse power flow from the power grid across said full bridge inverter stages when the output voltage of said stacked inverter phase is or falls below the power grid voltage.

2. The multiple DC voltage source inverter of claim 1, comprising three stacked inverter phases.

3. The multiple DC voltage source inverter of claim 2, comprising three stacked phases connected in a wye (Y) connection.

4. The multiple DC voltage source inverter of claim 2, comprising three stacked phases connected in a delta (Δ) connection.

5. The multiple DC voltage source inverter of claim 1, wherein each full bridge inverter stage incorporates a switch to short its output, allowing the stacked phase with the remaining series connected full bridge inverter stages to operate.

6. The multiple DC voltage source inverter of claim 1, comprising a component connected between the positive and negative nodes of said full bridge inverter stage, wherein the component is selected from the group consisting of: capacitors, batteries, fuel cells, photovoltaic cells and biomass cells.

7. The multiple DC voltage source inverter of claim 1, comprising a non-isolated switch mode voltage regulation circuit between the DC power source and the AC bridge of said full bridge inverter stage.

8. The multiple DC voltage source inverter of claim 1, comprising an isolated switch mode voltage regulation circuit between the DC power source and the AC bridge of said full bridge inverter stage.

9. The multiple DC voltage source inverter of claim 1, comprising an active filter between the DC power source and the AC bridge of said full bridge inverter stage to decouple AC current modulation imposed on the DC voltage source when used with current limiting DC sources including photovoltaic cells.

10. The multiple DC voltage source inverter of claim 1, wherein each of said stacked full bridge inverter stages operate with different power.

11. The multiple DC voltage source inverter of claim 1, comprising a variable number of stacked full bridges inverter stages for each phase.

12. The multiple DC voltage source inverter of claim 1, where said system controller incorporates at least one switch selectively connecting each stacked inverter phase to the grid.

13. The multiple DC voltage source inverter of claim 1, having:
  said system controller providing a system phase and frequency reference derived from a PLL circuit synchronized to the grid or derived from a local oscillator, said system controller including means of transmitting a periodic phase reference synchronization signal to each stacked inverter using a separate wire or by high frequency modulated transmission injected over the power cables connected between the system controller the series connected full bridge inverters; and said local controller coupled to each full bridge inverter stage having a detector circuit for recovery of such synchronization signal generated by said systems controller;

wherein said local controller includes a phase offset measurement error tolerant synchronization method.

14. The multiple DC voltage source inverter of claim 1, wherein said system controller calculates and communicates start-up voltage and operating voltage range to each full bridge inverter stage;

said system controller determines and communicates control commands for activation and deactivation of each full bridge inverter stage; and said system controller determines and communicates control commands for activation and deactivation of said multiple DC voltage source inverter.

* * * * *